(12) United States Patent
Oyama et al.

(10) Patent No.: US 11,877,899 B2
(45) Date of Patent: Jan. 23, 2024

(54) ROLLER BEARING

(71) Applicant: NSK LTD., Tokyo (JP)

(72) Inventors: Takuya Oyama, Fujisawa (JP); Hironori Suzuki, Fujisawa (JP)

(73) Assignee: NSK LTD., Tokyo (JP)

( * ) Notice: Subject to any disclaimer, the term of this patent is extended or adjusted under 35 U.S.C. 154(b) by 301 days.

(21) Appl. No.: 17/435,233

(22) PCT Filed: Mar. 11, 2020

(86) PCT No.: PCT/JP2020/010669
§ 371 (c)(1),
(2) Date: Aug. 31, 2021

(87) PCT Pub. No.: WO2020/195861
PCT Pub. Date: Oct. 1, 2020

(65) Prior Publication Data
US 2022/0142733 A1 May 12, 2022

(30) Foreign Application Priority Data
Mar. 28, 2019 (JP) .................................. 2019-063257

(51) Int. Cl.
*A61C 1/05* (2006.01)
*A61C 1/18* (2006.01)
(Continued)

(52) U.S. Cl.
CPC ................ *A61C 1/05* (2013.01); *A61C 1/181* (2013.01); *F16C 33/783* (2013.01);
(Continued)

(58) Field of Classification Search
CPC ................ F16C 33/783; F16C 33/7846; F16C 33/7856; F16C 43/045; F16C 2316/13; A61C 1/05; A61C 1/181
See application file for complete search history.

(56) References Cited

U.S. PATENT DOCUMENTS 2,764,433 A   9/1956   Cobb
2,959,819 A   11/1960  Potter
(Continued)

FOREIGN PATENT DOCUMENTS

CN     107110222 A    8/2017
EP     3239547 A1     11/2017
(Continued)

OTHER PUBLICATIONS

Machine Translation of JP-H11247867-A (Year: 1999).*
(Continued)

*Primary Examiner* — Alan B Waits
(74) *Attorney, Agent, or Firm* — Sughrue Mion, PLLC

(57) ABSTRACT

The rolling bearing includes: an outer ring having an outer ring raceway surface on an inner peripheral surface; an inner ring having an inner ring raceway surface on an outer peripheral surface; rolling elements rotatably arranged between the outer ring raceway surface and the inner ring raceway surface; and a seal member that is fixed to a seal attachment groove formed in an axially end portion of the outer ring by a snap ring and seals an axially end portion of a bearing internal space between the outer ring and the inner ring, in which an outer diameter of the seal member is larger than an outer diameter of the snap ring in the seal attachment groove, and in which a radially outer end portion of the seal member is sandwiched between an inner peripheral surface of the seal attachment groove and an outer peripheral surface of the snap ring.

3 Claims, 8 Drawing Sheets

(51) Int. Cl.
*F16C 33/78* (2006.01)
*F16C 43/04* (2006.01)

(52) U.S. Cl.
CPC ........ *F16C 33/7856* (2013.01); *F16C 43/045* (2013.01); *F16C 2316/13* (2013.01)

(56) References Cited

U.S. PATENT DOCUMENTS

| | | | |
|---|---|---|---|
| 3,003,835 | A | 10/1961 | Schindel |
| 3,226,168 | A * | 12/1965 | Recknagel .......... F16C 33/7856 277/572 |
| 2017/0348069 | A1* | 12/2017 | Nakahara .............. F16C 41/001 |
| 2020/0149590 | A1 | 5/2020 | Nakahara et al. |
| 2021/0186654 | A1 | 6/2021 | Nakahara et al. |

FOREIGN PATENT DOCUMENTS

| | | | | |
|---|---|---|---|---|
| JP | H11247867 | A * | 9/1999 | |
| JP | 2000-65076 | A | 3/2000 | |
| JP | 2007-333142 | A | 12/2007 | |
| JP | 2013050185 | A * | 3/2013 | ............ F16C 33/783 |
| JP | 2017-160929 | A | 9/2017 | |
| JP | 2017-211076 | A | 11/2017 | |

OTHER PUBLICATIONS

Machine Translation of JP-2013050185-A (Year: 2013).*
International Search Report (PCT/ISA/210) dated Jun. 9, 2020 by the International Searching Authority in counterpart International Patent Application No. PCT/JP2020/010669.
Written Opinion (PCT/ISA/237) dated Jun. 9, 2020 by the International Searching Authority in counterpart International Patent Application No. PCT/JP2020/010669.
Office Action dated Aug. 24, 2022, issued by the China National Intellectual Property Administration in counterpart Chinese Patent Application No. 202080018428.2.
Communication dated Apr. 19, 2022 issued by the European Patent Office in application No. 20778663.3.

* cited by examiner

ROLLER BEARING

TECHNICAL FIELD

The present invention relates to a roller bearing, and more particularly to a roller bearing used in an air turbine.

BACKGROUND ART

As a roller bearing for a dental air turbine in the related art, a roller bearing using a seal member suitable for ultrahigh-speed rotation is known (for example, see Patent Literature 1). Then, the roller bearing includes an outer ring, an inner ring, a plurality of balls arranged between the outer ring and the inner ring, a cage that rotatably holds the plurality of balls, an annular seal member provided between the outer ring and the inner ring, and a snap ring that attaches the seal member to the outer ring In the roller bearing, the seal member does not include a metal insert and is made of only an elastic material.

CITATION LIST

Patent Literature

Patent Literature 1: JP-A-2017-211076

SUMMARY OF INVENTION

Technical Problem

However, in the roller bearing described in the above-described Patent Literature 1, the seal member is fixed to a groove portion of the outer ring by a pressing force of the snap ring in a thrust direction. Therefore, when the roller bearing is used in a situation where compressed air acts on the seal member, further strengthened fixation may be required. In such a case, if a fixing member in a radial direction can be provided, further strengthened seal fixation can be provided.

The present invention has been made in view of the above-described problems, and an object thereof is to provide a roller bearing in which a restraining force of a seal member is further strengthened.

The above-described object of the present invention is achieved by the following configurations.

(1) A roller bearing including: an outer ring having an outer ring raceway surface on an inner peripheral surface; an inner ring having an inner ring raceway surface on an outer peripheral surface; a plurality of rolling elements rotatably arranged between the outer ring raceway surface and the inner ring raceway surface; and a seal member that is fixed to a seal attachment groove formed in an axially end portion of the outer ring by a snap ring and seals an axially end portion of a bearing internal space between the outer ring and the inner ring, in which an outer diameter of the seal member is larger than an outer diameter of the snap ring in the seal attachment groove, and in which a radially outer end portion of the seal member is sandwiched between an inner peripheral surface of the seal attachment groove and an Outer peripheral surface of the snap ring.

(2) The roller bearing according to (1), in which the seal attachment groove includes a groove bottom surface with which an outer peripheral surface of the seal member is in contact, a tapered surface that is provided on an axially outer side of the groove bottom surface, that connects the groove bottom surface and an inner peripheral surface of the outer ring, and with which the snap ring is in contact, and a groove inner side surface that is provided on an axially inner side of the groove bottom surface and with which an axially inner side surface of the seal member is in contact.

(3) The roller bearing according to (2), in Which the seal attachment groove includes a step portion provided at a boundary portion between the groove bottom surface and the groove inner side surface.

(4) The roller bearing according to any one of to (3), in which the roller bearing is for a dental air turbine.

Advantageous Effects of Invention

According to the present invention, since the radially outer end portion of the seal member is sandwiched between the inner peripheral surface of the seal attachment groove and the outer peripheral surface of the snap ring, a restraining force of the seal member in a radial direction can be generated. Accordingly, the restraining force of the seal member can be further increased.

DESCRIPTION OF EMBODIMENTS

Figure 1:
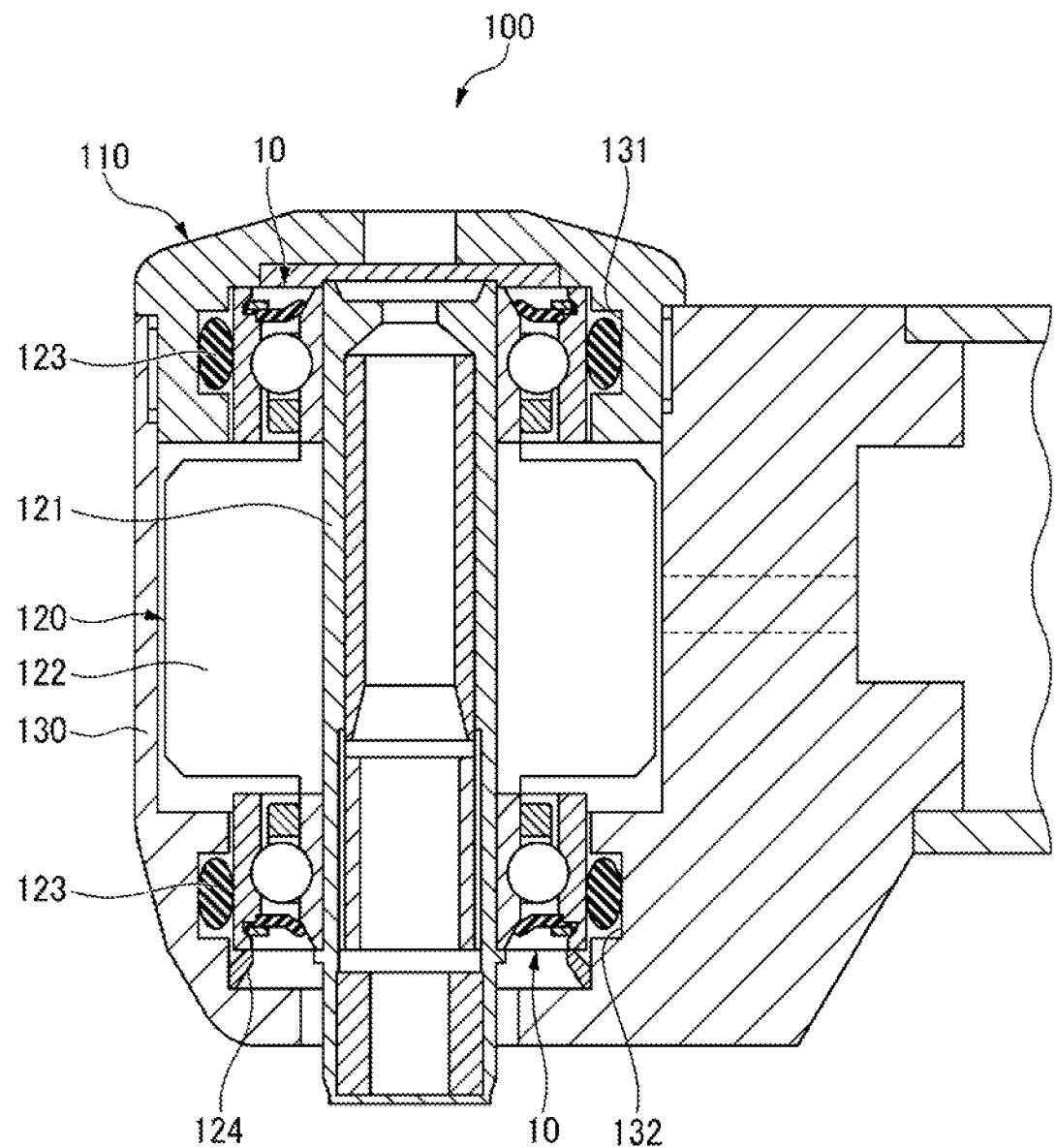
FIG. 1 is an enlarged cross-sectional view of a head portion of a dental air turbine hand-piece in which a first embodiment of a roller bearing according to the present invention is adopted.

Hereinafter, embodiments of a roller bearing according to the present invention will be described in detail with reference to the drawings.

First Embodiment

First, a first embodiment of the roller bearing according to the present invention will be described with reference to FIGS. 1 to 7.

Roller bearings 10 of the present embodiment are adopted in a bearing unit 120 of a head portion 110 of a dental air turbine band-piece 100. The bearing unit 120 includes a rotation shaft 121 to which a tool (for example, a dental treatment tool) can be attached at one end, a turbine blade 122 integrally fixed to the rotation shaft 121 and rotated by receiving compressed air, and a pair of roller bearings 10 that rotatably support the rotation shaft 121 with respect to a housing 130.

The roller bearings 10 are supported by the housing 130 via rubber rings 123 mounted on annular recessed portions 131 and 132 of the housing 130. Further, the roller bearing 10 on one side (lower side in FIG. 1) is biased toward the roller bearing 10 on the other side (upper side in FIG. 1) by a spring washer 124.

Figure 2:
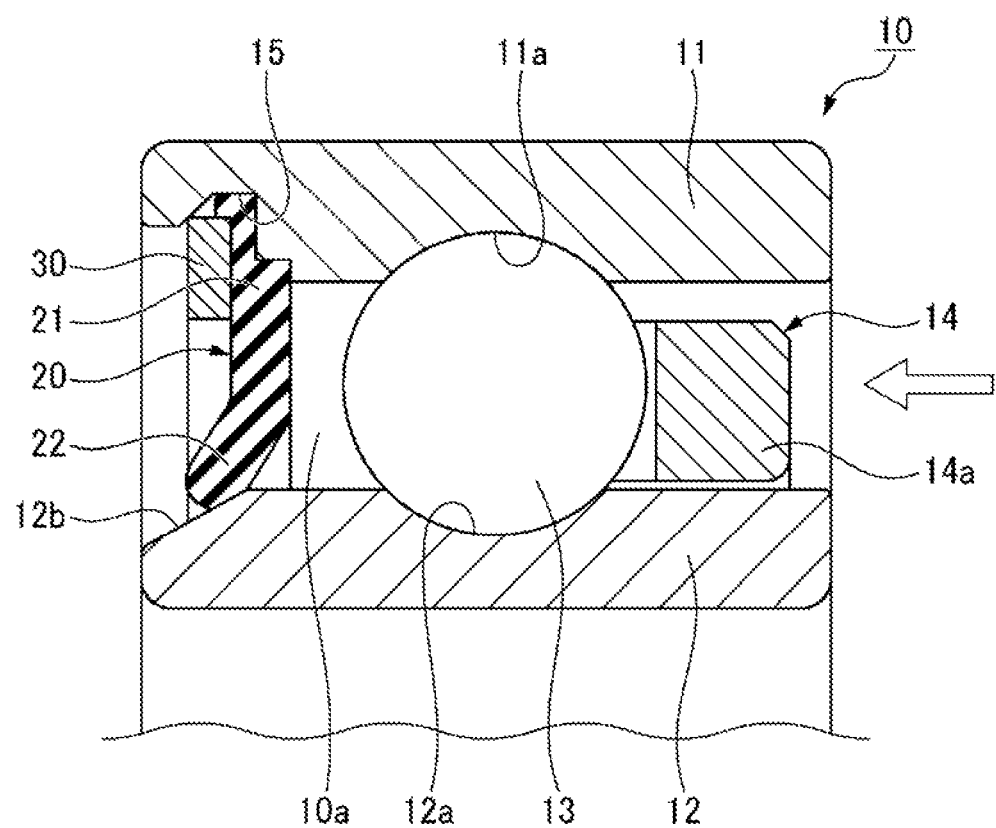
FIG. 2 is a cross-sectional view of the roller bearing shown in FIG. 1.

As shown in FIG. 2, the roller bearing 10 includes an outer ring 11 having an outer ring raceway surface 11a on an inner peripheral surface, an inner ring 12 having an inner ring raceway surface 12a on an outer peripheral surface, a plurality of balls (rolling elements) 13 rotatably arranged between the outer ring raceway surface 11a and the inner ring raceway surface 12a, a cage 14 that holds the plurality of balls 13 at substantially equal intervals in a circumferential direction, and a seal member 20 that is fixed by a snap ring 30 to a seal attachment groove 15 formed in one axial end portion of the outer ring 11 and seals one axial end portion of a bearing internal space 10a between the outer ring 11 and the inner ring 12. The roller bearing 10 is not limited to the illustrated deep groove ball bearing, and may be an angular contact ball bearing.

The cage 14 is a crown-shaped cage. An annular rim portion 14a is disposed on an upstream side (right side in FIG. 2) in a supply direction of the compressed air with respect to the balls 13. An arrow in FIG. 2 indicates a direction in which the compressed air flows.

Further, the cage is not limited to the crown-shaped cage.

The seal member 20 is an annular member, and includes only an elastic member without a metal insert. The seal member 20 is disposed on a downstream side (left side in FIG. 2) in the supply direction of the compressed air with respect to the balls 13.

Figure 4:
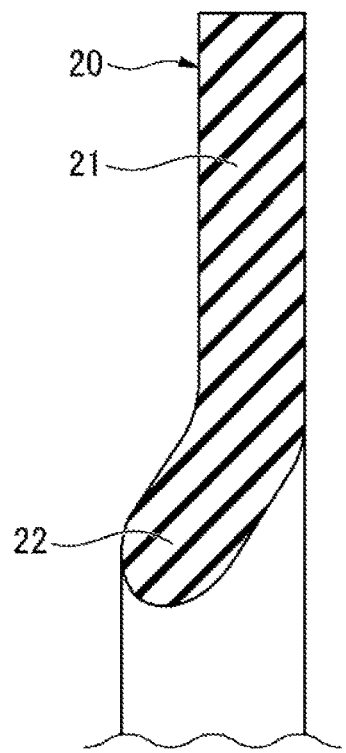
FIG. 4 is an enlarged cross-sectional view of a state before attachment of a seal member shown in FIG. 2.

As shown in FIGS. 2 and 4, the seal member 20 includes a base portion 21 that extends along a radial direction, and a lip portion 22 that extends obliquely radially inboard and axially outboard from a radially inner end of the base portion 21 and that is in contact with an outer peripheral surface of the inner ring 12. Further, as shown in FIG. 4, before being attached to the outer ring 11, the base portion 21 of the seal member 20 alone is not formed with a step that matches a shape of a step portion 15d described later, and has the same width up to a radially outer end portion.

Then, an outer peripheral portion of the seal member 20 is fixed, by the snap ring 30, to the seal attachment groove 15 formed in one axial end portion (eft end portion in FIG. 2) of an inner peripheral surface of the outer ring 11. The snap ring 30 is a ring-shaped member having a rectangular cross-section, which is partially divided. Further, an outer diameter of the seal member 20 is set to be larger than an outer diameter of the snap ring 30 in the seal attachment groove 15.

Examples of a material of the seal member 20 can include water-resistant acrylic rubber having a Shore-A hardness (JIS K 6253) of 60 to 90 and general water-resistant fluorine-containing rubber having a Shore-A hardness of 60 to 90. Since the above-described material is used for the seal member 20, appropriate elastic properties can be obtained, and durability and wear resistance can be improved.

A tapered surface 12b with which the lip portion 22 of the seal member 20 is in contact is formed on one axial end portion (left end portion in FIG. 2) of the outer peripheral surface of the inner ring 12. The tapered sur ice 12b is formed such that a diameter gradually decreases toward an axially outer side.

Figure 3:
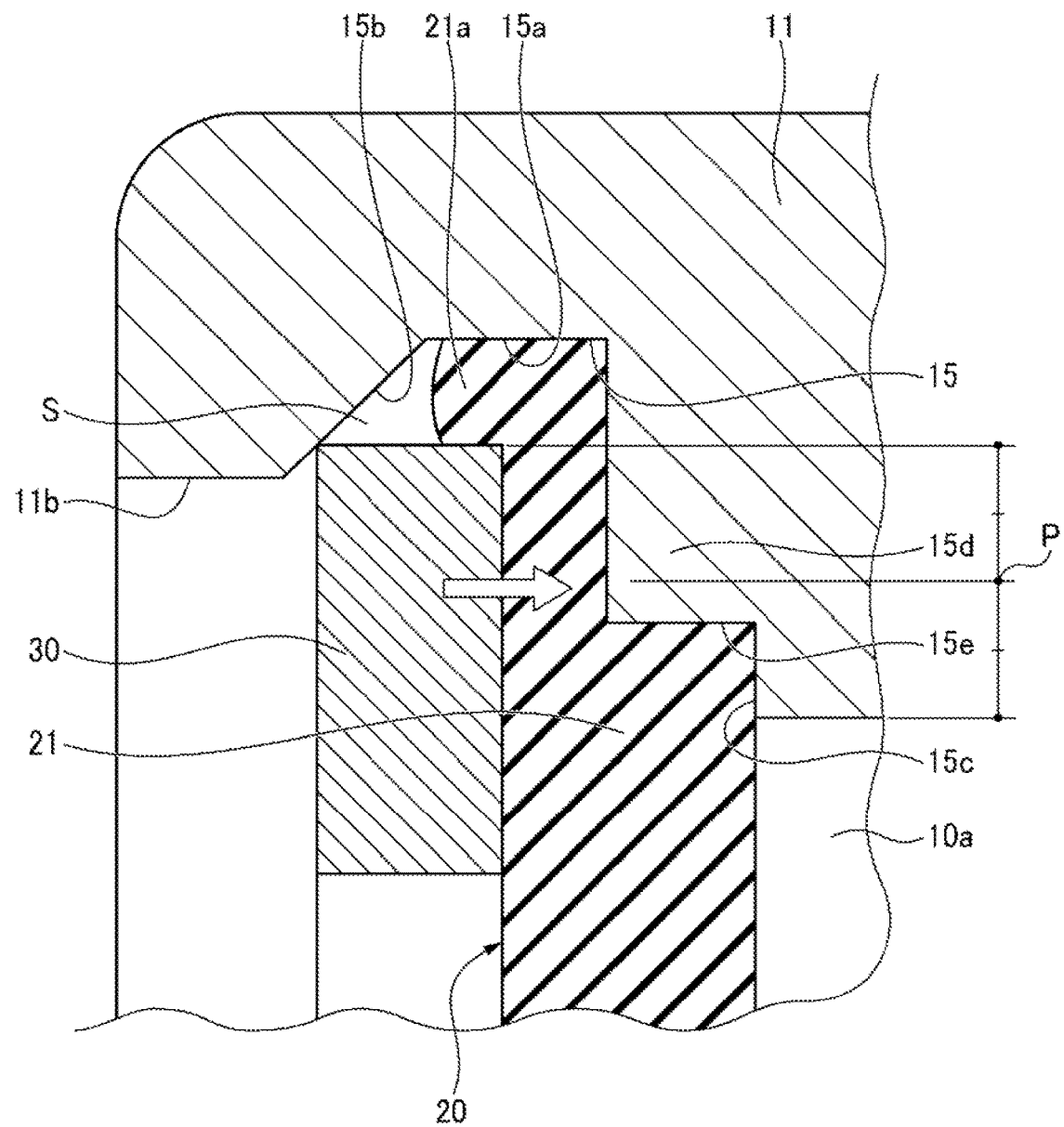
FIG. 3 is an enlarged cross-sectional view of a periphery of a snap ring shown in FIG. 2.

As shown in FIG. 3, the seal attachment groove 15 includes a groove bottom surface 15a with which an outer peripheral surface of the seal member 20 is in contact, a tapered surface 15b that is provided on an axially outer side of the groove bottom surface 15a, that connects the groove bottom surface 15a and an outside inner peripheral surface 11b of the outer ring 11, and with which the snap ring 30 is in contact, a groove inner side surface 15c that is provided on an axially inner side of the groove bottom surface 15a and with which an axially inner side surface of the seal member 20 is in contact, and a step portion 15d provided at a boundary portion between the groove bottom surface 15a and the groove inner side surface 15c. The tapered surface 15b is formed such that a diameter gradually increases toward an axially inner side.

Figure 5:
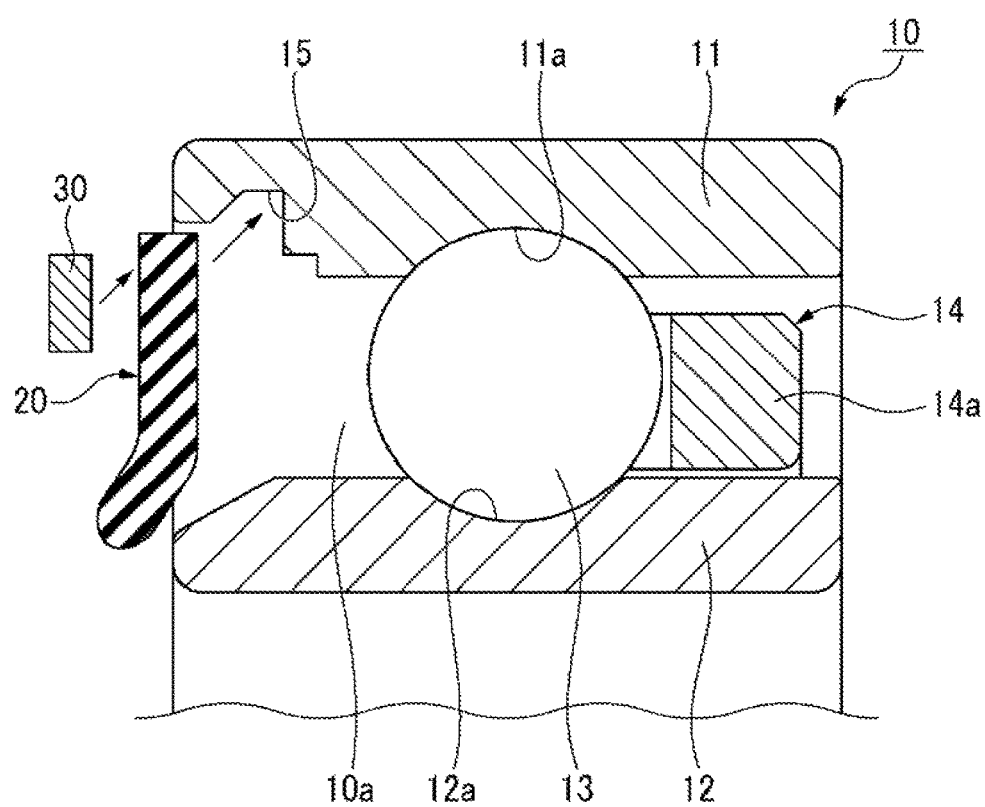
FIG. 5 is a view illustrating attachment of the snap ring and the seal member shown in FIG. 2.

Then, as shown in FIG. 5, the seal member 20 is fitted into the seal attachment groove 15, and the snap ring 30 whose diameter is decreased is fitted into the seal attachment groove 15, so that the snap ring 30 is increased in diameter, and an outer peripheral edge of an axially outer side surface of the snap ring 30 is in contact with the tapered surface 15b of the seal attachment groove 15. Accordingly, a force that attempts to expand radially outward of the snap ring 30 is converted into a force that presses the seal member 20 axially inward (a pressing force in a thrust direction) by the tapered surface 15b, and the base portion 21 of the seal member 20 is sandwiched between the snap ring 30 and the step portion 15d (including the groove inner side surface 15c).

Therefore, a part of a radially outer end portion of the seal member 20 is elastically deformed and protrudes in a direction of the tapered surface 15b of the seal attachment groove 15, and is sandwiched between an inner peripheral surface of the seal attachment groove 15 (the groove bottom surface 15a in the present embodiment) and an outer peripheral surface of the snap ring 30. Then, a reference numeral 21a in FIG. 3 denotes a portion sandwiched between the inner peripheral surface of the seal attachment groove 15 at the radially outer end portion of the seal member 20 and the outer peripheral surface of the snap ring 30. The inner peripheral surface of the seal attachment groove 15 that sandwiches the radially outer end portion of the seal member 20 may include the tapered surface 15b.

In this way, a part of the radially outer end portion of the seal member 20 (a portion denoted by the reference numeral 21a) is sandwiched between the inner peripheral surface of the seal attachment groove 15 and the outer peripheral surface of the snap ring 30, so that a restraining force of the seal member 20 in a radial direction is generated. Further, the step portion 15d is formed in the seal attachment groove 15, so that a deformation amount of the base portion 21 of the seal member 20 becomes larger than that in the related art. Therefore, the restraining force of the seal member 20 in a thrust direction is increased. That is, in the present embodiment, the restraining force of the seal member 20 in the radial direction not found in the related art is generated, and the restraining force of the seal member 20 in the thrust direction is increased as compared with the related art.

In consideration of dimensional tolerances of the seal attachment groove 15, the seal member 20, the snap ring 30, and the like, it is preferable that a space S is formed between the inner peripheral surface of the seal attachment groove 15 and the outer peripheral surface of the snap ring 30.

Further, in the present embodiment, in a state where the seal member 20 and the snap ring 30 are attached to the seal attachment groove 15, it is preferable that a radially inner end portion 15e of the step portion 15d is provided to be located radially inward of a midpoint. P in a radial direction between the outer peripheral surface of the snap ring 30 and the inner peripheral surface of the outer ring 11. Accordingly, since an area of the step portion 15d that presses the seal member 20 in the seal attachment groove 15 is increased, a part of the radially outer end portion of the seal member 20 (the portion denoted by the reference numeral 21a) is easily sandwiched between the inner peripheral surface of the seal attachment groove 15 and the outer peripheral surface of the snap ring 30.

As described above, according to the roller bearing 10 of the present embodiment, since the radially outer end portion of the seal member 20 is sandwiched between the inner peripheral surface of the seal attachment groove 15 and the outer peripheral surface of the snap ring 30, the restraining force of the seal member 20 in the radial direction can be generated. Accordingly, the restraining force of the seal member 20 can be further increased.

According to the roller bearing 10 of the present embodiment, since the seal attachment groove 15 includes the step portion 15d provided at the boundary portion between the groove bottom surface 15a and the groove inner side surface 15c, as compared with a case where the step portion 15d is not formed, the deformation amount of the base portion 21 of the seal member 20 can be increased, and the restraining force of the seal member 20 in the thrust direction can be increased. Accordingly, the restraining force of the seal member 20 can be further increased.

Figure 6:
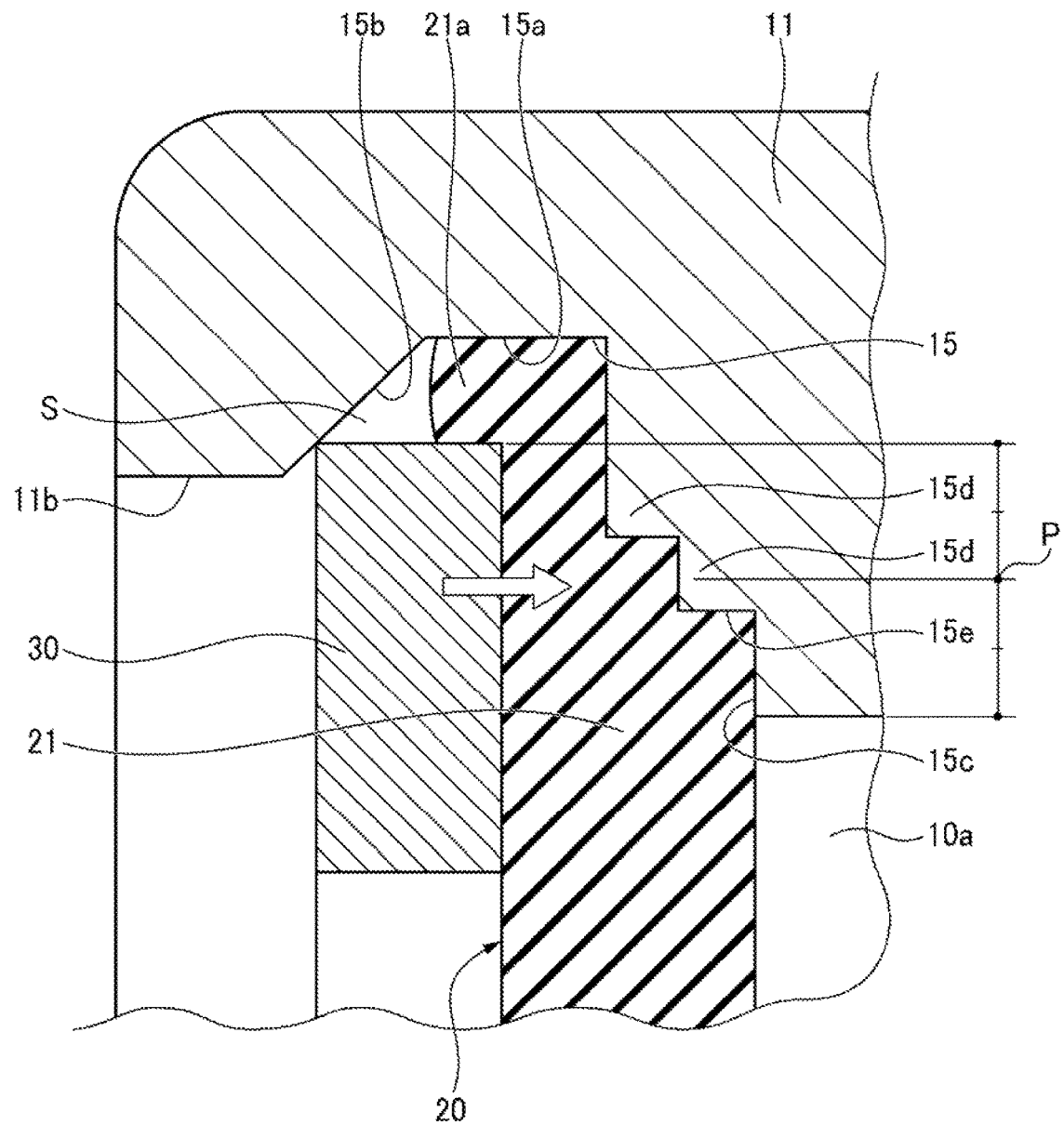
FIG. 6 is an enlarged cross-sectional view of a main part illustrating a first modification of the roller bearing of the first embodiment.

As a first modification of the present embodiment, as shown in FIG. 6, the step portion 15d of the seal attachment groove 15 is not limited to one step, and may include two or more steps.

Figure 7:
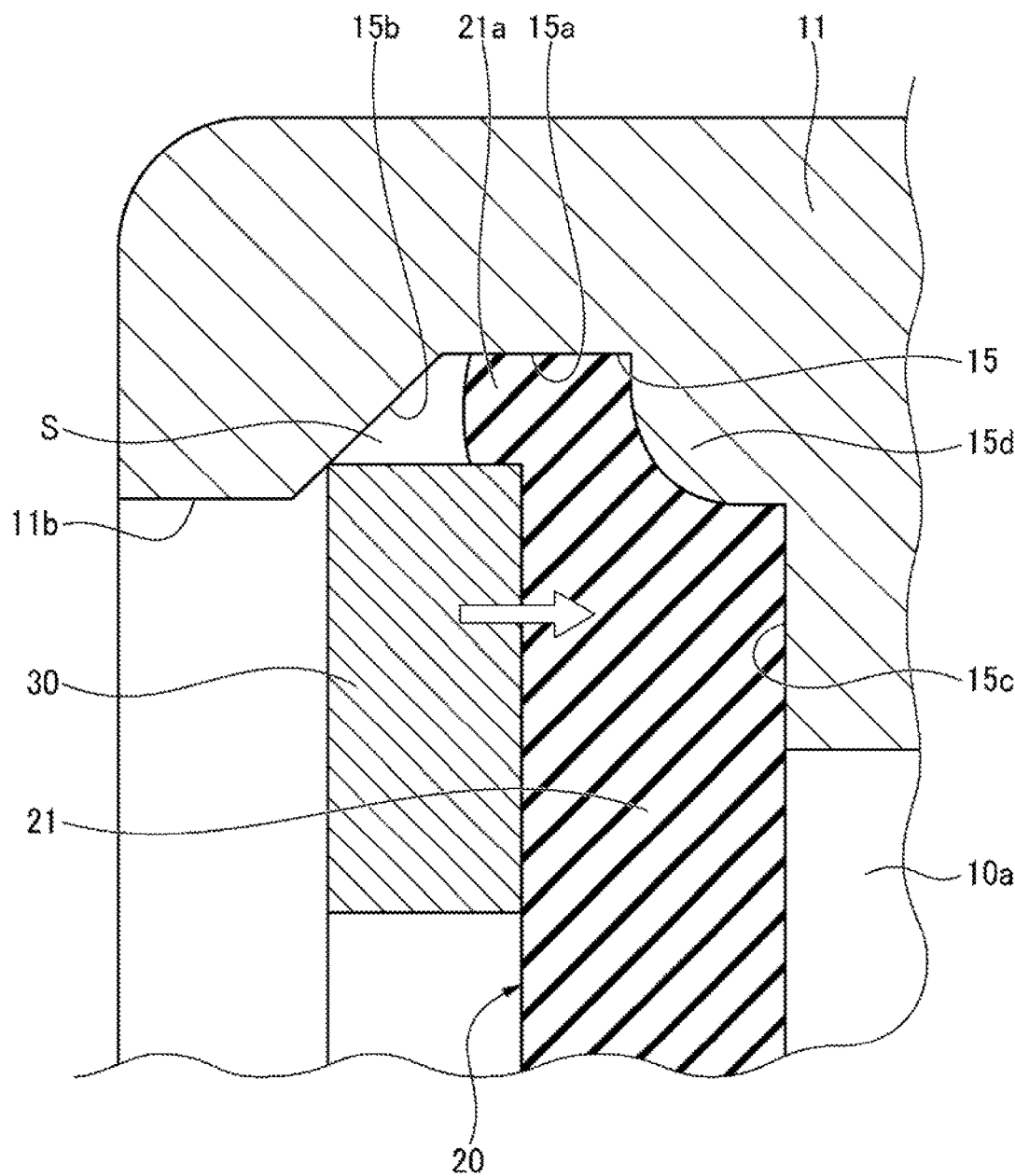
FIG. 7 is an enlarged cross-sectional view of a main part illustrating a second modification of the roller bearing of the first embodiment.

As a second modification of the present embodiment, as shown in FIG. 7, the step portion 15d of the seal attachment groove 15 is not limited to having the rectangular cross-section, and may have a convex arc cross-section, or may have a polygonal cross-section.

Second Embodiment

Next, a second embodiment of the roller bearing 10 according to the present invention will be described with reference to FIGS. 8 and 9. Parts that are the same as or equivalent to those of the above-described first embodiment are denoted by the same reference numerals in the drawings, and explanation thereof is omitted or simplified.

Figure 8:
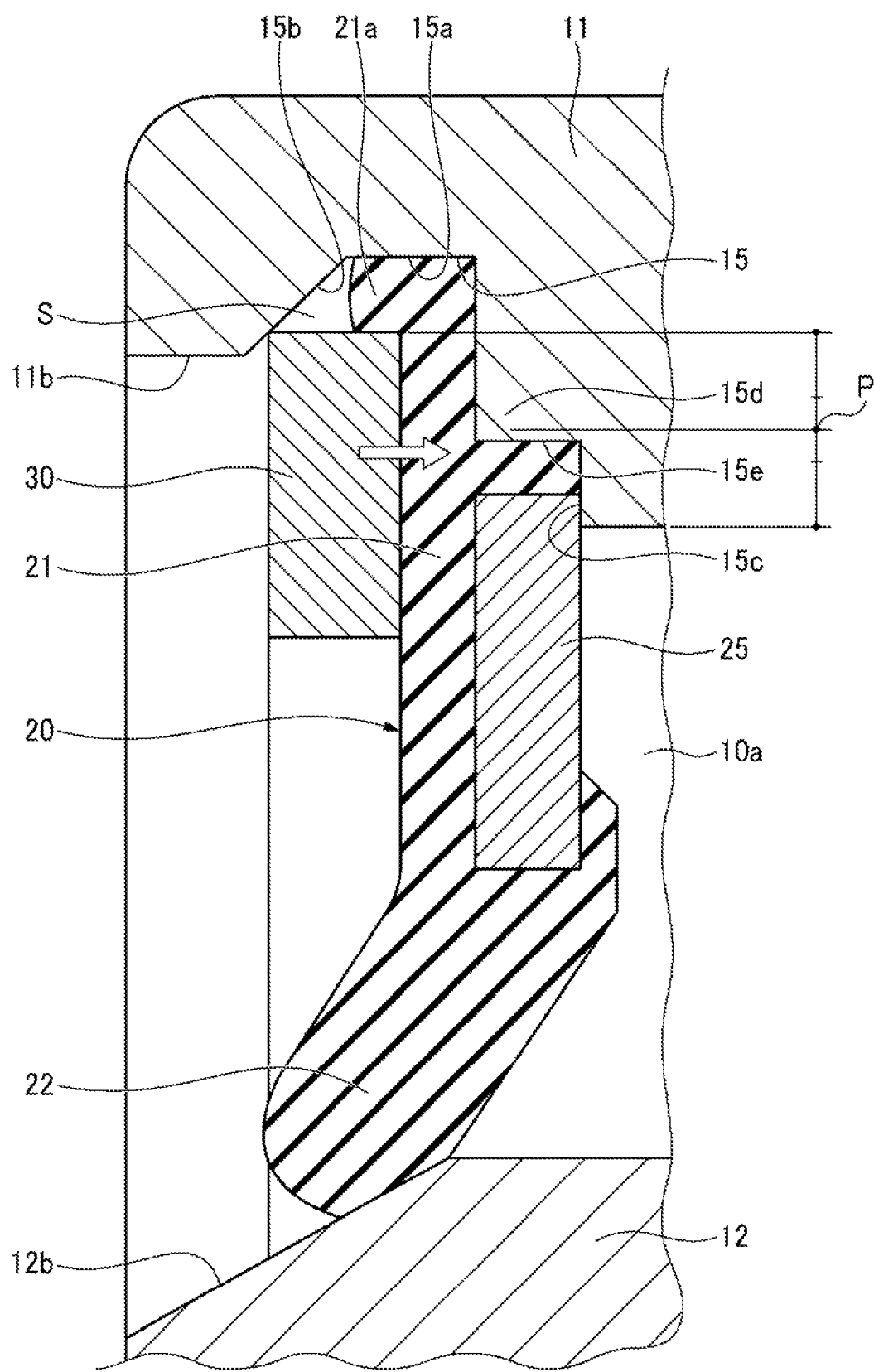
FIG. 8 is an enlarged cross-sectional view of a main part illustrating a second embodiment of the roller bearing according to the present invention.
Figure 9:
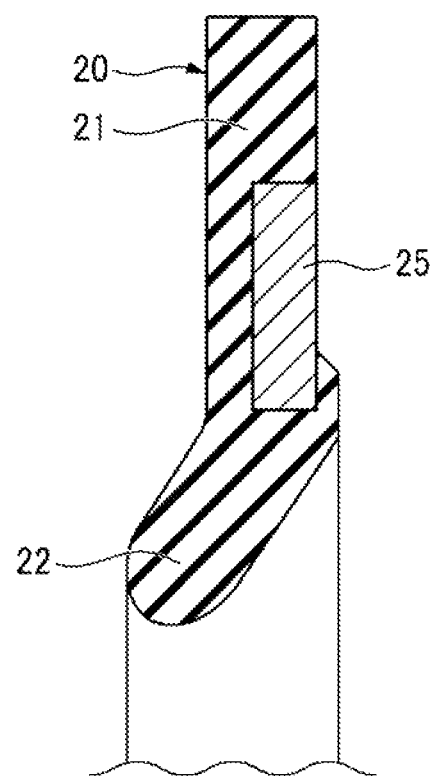
FIG. 9 is an enlarged cross-sectional view of a state before attachment of the seal member shown in FIG. 8.

In the present embodiment, as shown in FIGS. 8 and 9, the seal member 20 may include a metal insert 25 in the base portion 21. The metal insert 25 is integrally provided on an axially inner side of the base portion 21, and a part of an axially inner side surface thereof is exposed to a ball 13 side. Further, the metal insert 25 is disposed radially inward of the radially inner end portion 15e of the step portion 15d. Further, a radially outer end portion of an axially inner side surface of the metal insert 25 is in contact with the groove inner side surface 15c of the seal attachment groove 15.

Then, according to the present embodiment, since a volume of the metal insert 25 necessary for fixing the seal member can be reduced, a friction torque of the seal member 20 can be reduced, and a manufacturing cost of the seal member 20 can be reduced.

Other configurations, operations, and effects are the same as those of the above-described first embodiment.

The present invention is not limited to the bearings exemplified in the above-described embodiments, but can be changed appropriately within a scope not departing from the gist of the present invention.

For example, the step portion of the seal attachment groove may be formed up to the same radial position as the inner peripheral surface of the outer ring. That is, in this case, the groove inner side surface is not formed.

Further, the snap ring is not limited to having the rectangular cross-section, and may have a circular cross-section.

Further, the snap ring may be formed with a tapered surface, and the seal attachment groove may be formed with a rectangular cross-section, so that the tapered surface of the Snap ring is in contact with a corner portion of the seal attachment groove having the rectangular cross-section.

The present application is based on a Japanese patent application (Japanese Patent Application No. 2019-063257) filed on Mar. 28, 2019, the contents of which are incorporated herein by reference.

REFERENCE SIGNS LIST

10: roller bearing
10a: bearing internal space
11: outer ring
11a: outer ring raceway surface
12: inner ring
12a: inner ring raceway surface
13: ball (rolling element)
14: cage
15: seal attachment groove
15a: groove bottom surface
15b: tapered surface
15c: groove inner side surface
15d: step portion
15e: radially inner end portion of step portion
20: seal member
21: base portion
21a: portion sandwiched between seal attachment groove and snap
22: lip portion
30: snap ring

The invention claimed is:

1. A roller bearing comprising:
an outer ring having an outer ring raceway surface on an inner peripheral surface;
an inner ring having an inner ring raceway surface on an outer peripheral surface;
a plurality of rolling elements rotatably arranged between the outer ring raceway surface and the inner ring raceway surface; and
a seal member that is fixed to a seal attachment groove formed in an axially end portion of the outer ring by a snap ring and seals an axially end portion of a bearing internal space between the outer ring and the inner ring,
wherein an outer diameter of the seal member is larger than an outer diameter of the snap ring in the seal attachment groove,
wherein the seal attachment groove includes
a groove bottom surface with which an outer peripheral surface of the seal member is in contact;
a groove inner side surface that is provided on an axially inner side of the groove bottom surface and with which an axially inner side surface of the seal member is in contact; and
a step portion at a boundary portion between the groove bottom surface and the groove inner side surface, the step portion configured to increase a restraining force of the seal member, and
wherein a radially outer end portion of the seal member is sandwiched between the groove bottom surface and an outer peripheral surface of the snap ring.

2. The roller bearing according to claim 1,
wherein the seal attachment groove further includes
a tapered surface that is provided on an axially outer side of the groove bottom surface, that connects the groove bottom surface and an inner peripheral surface of the outer ring, and with which the snap ring is in contact.

3. A dental air turbine comprising the roller bearing according to claim 1.

* * * * *